United States Patent [19]

Hershey

[11] Patent Number: 5,568,508
[45] Date of Patent: * Oct. 22, 1996

[54] INTERLACED GEOMETRIC HARMONIC MODULATION

[75] Inventor: John E. Hershey, Ballston Lake, N.Y.

[73] Assignee: General Electric Company, Schenectady, N.Y.

[ * ] Notice: The term of this patent shall not extend beyond the expiration date of Pat. No. 5,568,507.

[21] Appl. No.: 407,551

[22] Filed: Mar. 20, 1995

[51] Int. Cl.⁶ .............................. H04B 1/69; H04B 7/12
[52] U.S. Cl. ........................ 375/200; 375/267; 375/299; 455/59
[58] Field of Search .................................. 375/200, 206, 375/267, 299; 455/59, 101

[56] References Cited

U.S. PATENT DOCUMENTS

| | | | |
|---|---|---|---|
| 4,628,517 | 12/1986 | Schwarz et al. | 375/299 |
| 5,063,560 | 11/1991 | Yerbury et al. | 375/206 |

FOREIGN PATENT DOCUMENTS 1173607  12/1969  United Kingdom .

OTHER PUBLICATIONS

U.S. patent application entitled "Dynamic Code Division Multiple Access Communication System", (Attorney Docket No. RD-24193) J. E. Hershey, A. A. Hassan, G. J. Saulnier.

U.S. patent application entitled "method of Geometric Harmonic Modulation (GHM)", (Attorney Docket No. RD-23786), J. E. Hershey, G. J. Saulnier, A. A. Hassan.

U.S. patent application entitled "Geometric Harmonic Modulation (GHM) -Digital Implementation", (Attorney Docket No. RD-24194), J. E. Hershey, G. J. Saulnier, A. A. Hassan.

U.S. patent application entitled "Geometric Harmonic Modulation(GHM) For Combined Analog/Digital Transmissions", (Attorney Docket No. RD-24195), J. E. Hershey, G. J. Saulnier, A. A. Hassan.

U.S. patent application entitled "Correction of Multipath Distortion in Wideband Carrier Signals", (Attorney Docket No. RD-24196), J. E. Hershey, G. J. Saulnier.

U.S. patent application entitled "Geometric Harmonic Modulation (GHM)–Analog Implementation", (Attorney Docket No. RD-24203), J. E. Hershey, G. J. Saulnier, A. A. Hassan.

"A 200-MHz Double-Sideband to Single-Sideband Converter in 1-mm CMOS Generated by Silicon Compiler", by R. Hawley, T-j Lin, H. Samueli, 1992 Symposium on VLSI Circuits Digest of Technical Papers, pp. 72-73.

*Primary Examiner*—Stephen Chin
*Assistant Examiner*—Jeffrey W. Gluck
*Attorney, Agent, or Firm*—Lawrence P. Zale; Marvin Snyder

[57] ABSTRACT

The present invention provides a novel frequency Interlaced Geometric Harmonic Modulation (IGHM) system. The IGHM system operates in two modes, a preamble mode and a traffic mode. During the preamble mode, n+1 frequencies are each offset by a predetermined phase in a transmit unit and passed through a channel to a receive unit. The set of phases is used as the spreading code in the transmit unit, and also acts as an 'address' of desired receive units. The receive unit monitors preamble signals to determine the phases. When it recognizes a set of phases, or 'address', which pertains to itself, the receive unit stores the phases and uses these phases to despread and decode the appended message. After the preamble mode is finished, the IGHM modulator enters the traffic mode and requests the message to be transmitted from the message source. Two traffic carrier waveforms are created, the first by multiplying tones, each having its specific phase, and the second by shifting all components of the first carrier waveform up by the fundamental frequency. A message is encoded in each of the traffic carrier waveforms and transmitted to a receive unit. The receive unit detects a preamble carrier and recovers the particular preamble phases to be used as the despreading 'key'. The receive unit then employs the phases in separating and despreading the received signal to recover both of the transmitted messages.

3 Claims, 4 Drawing Sheets

INTERLACED GEOMETRIC HARMONIC MODULATION

CROSS REFERENCES TO RELATED APPLICATIONS

This application is related to U.S. Patent applications "Method Of Geometric Harmonic Modulation (GHM)" Ser. No. 08/407,560, "Geometric Harmonic Modulation (GHM)—Analog Implementation"Ser. No. 08/407,088, "Geometric Harmonic Modulation (GHM) For Combined Analog/Digital Transmissions", Ser. No. 08/407,555, "Geometric Harmonic Modulation (GHM)—Digital Implementation" Ser. No. 08/407,554 by Hershey, Saulnier, Hassan; "Dynamic Code Division Multiple Access Communication System" Ser. No. 08/407,552 by Hershey, Hassan, Saulnier; "Correction Of Multipath Distortion In Wideband Carrier Signals" Ser. No. 08/407,559 by Hershey, Saulnier, all filed Mar. 20, 1995 all assigned to the present assignee and hereby incorporated by reference.

BACKGROUND OF THE INVENTION

1. Field of the Invention

This invention relates to electronic signal modulation, and more specifically, to spread spectrum modulation.

2. Description of Related Art

Spread spectrum techniques of communicating a message from a transmit unit to a receive unit are those modulation techniques which require a transmission bandwidth that far exceeds the message information bandwidth. The spread spectrum modulation characteristics should not depend upon the individual message to be transmitted as is the case with some other wideband modulation schemes such as wideband FM. There are many spread spectrum mechanisms. They can be conveniently classified as: (i) direct sequence, (ii) frequency hopping, (iii) time hopping, and (iv) hybrids.

In direct sequence spread spectrum modulation, a relatively narrowband message is spread with a 'spreading code' to yield an encoded wideband signal. The spreading code is then required 'despread' the signal at the receive unit.

There are many uses for direct sequence spread spectrum techniques. One primary use is that of spectrum sharing. It is possible for a number of different communicating pairs to occupy the same bandwidth simultaneously without significant mutual interference. This is usually accomplished in direct sequence spread spectrum systems by assigning each communicating pair a different spectrum spreading code.

Typically, one problem with direct sequence spread spectrum communications is synchronization. In order to function properly, the receiver must generate a copy of the spreading code at the same rate as the transmit unit. The receive unit must also correct relative phase discrepancies between the transmit and receive unit. This requires correct synchronization to be established and maintained at a stringent tolerance. Further, the receiver must know the particular spreading code employed by the transmit unit in order to despread the signal and recover the message.

With the increase of digital communication, more data is required to be passed over existing channels. This results in a need for increased data capacity per channel bandwidth.

Currently there is a need for a simplified method of increased capacity direct spread spectrum modulation of information.

SUMMARY OF INVENTION

The present invention performs an increased capacity spread-spectrum modulation/demodulation in a simplified manner requiring less complex and powerful hardware.

A first traffic waveform is constructed from a plurality of n+1 tones multiplied by each other. The frequency of each tone is an even multiple of a predetermined fundamental frequency. The tone frequencies may be geometrically increasing multiples of the fundamental frequency, being geometric harmonic modulation (GHM). Each of the tones is offset with a phase $\phi_i$, except for the fundamental tone having a 0 phase. Phases $\Phi=(\phi_0, \phi_1, \phi_2, \ldots \phi_n)$ are used as an 'address' and also as the spreading code.

The first traffic waveform is inverted for a one bit value of the first message signal $m_1[i]$ and left unchanged for the second bit value to result in an encoded first waveform.

A second traffic waveform having components with frequencies between those of the first traffic waveform, is constructed. The second traffic waveform is derived from the first traffic waveform by shifting the frequency of each component of the first traffic waveform by the fundamental frequency to result in interleaved components of the first and second traffic waveforms.

A second message $m_2[i]$ is encoded in the second traffic waveform by inverting the second traffic waveform for one bit value and leaving the waveform unchanged for a second bit value to result in an encoded second waveform.

The first and second encoded waveforms are added to produce a traffic signal which is transmitted to a receive unit.

Phases are either prestored in the receive unit or transmitted to the receive unit. One method of transmitting the phases is to create a preamble carder waveform having no encoded message signals. The preamble waveform is constructed by summing together a plurality of n+1 tones each having offset by phases $\phi_1, \phi_2, \ldots \phi_n$, with $\phi_0=0$. The receive unit monitors the preamble signals to determine when a message having the proper 'address' is encountered. The set of phases $\phi_0, \phi_1, \phi_2, \ldots \phi_n$, or 'address', is stored in the receive unit to be employed in the despreading of the signal.

In a "traffic mode", the receive unit senses a receive traffic signal. The phases extracted during the preamble mode are used to construct a first reference signal, being the same as the first traffic waveform in the transmit unit, which is compared to the received traffic signal. Since the first and second traffic waveforms are chosen to be mathematically orthogonal, the comparison of the first reference signal with the received traffic signal, produces either a correlation of approximately 1 or −1, meaning that the signal matches, and is inverted, respectively, corresponding to bits of the first message signal $m_1[i]$. The second traffic waveform and the second message $m_2[i]$ does not interfere, or interferes very little, with the first message and traffic waveform.

A second reference signal is constructed, either from the first reference signal, or not, and compared to the received traffic signal. This results in a second message signal $m_2[i]$ with little or no interference from the first message signal and traffic waveform.

The present invention results in increased capacity digital communication. The first and second message signals occupy the same bandwidth simultaneously with little mutual interference.

The synchronization is not necessarily as difficult as conventional direct sequence spread spectrum systems since all tones are multiples of a fundamental tone having a phase of zero.

OBJECTS OF THE INVENTION

An object of the present invention is to provide a method of spread spectrum communication of message signals having increased capacity.

Another object of the present invention is to provide a direct spread spectrum communications system capable of transmitting two different messages on the same carder waveform.

Another object of the present invention is to provide a method of transmitting a message from two different sources simultaneously on the same spread spectrum carrier waveform.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENT

Consider that the system supports a number of simultaneous users. Each user of the system signals one bit per symbol time defined as the reciprocal of the signaling rate R. (If an analog message is sent, R represents the extent of bandwidth spreading.) The signaling waveform is a member of $\{W_n(\Phi, R;t)\}$ where $$W_n(\Phi,R;t) = \prod_{i=0}^{n} \sin(2^i \cdot 2\pi Rt + \phi_i) \quad (1)$$

where n is the "order" of the function, $\Phi=(\phi_0, \phi_1, \ldots \phi_n)$, and $$\phi_i \in \left\{ 0, -\frac{\pi}{2} \right\}.$$

For finite order, n, the functions and all of their derivatives are continuous in the interval $$\left( 0, \frac{1}{R} \right).$$

Figure 1A:
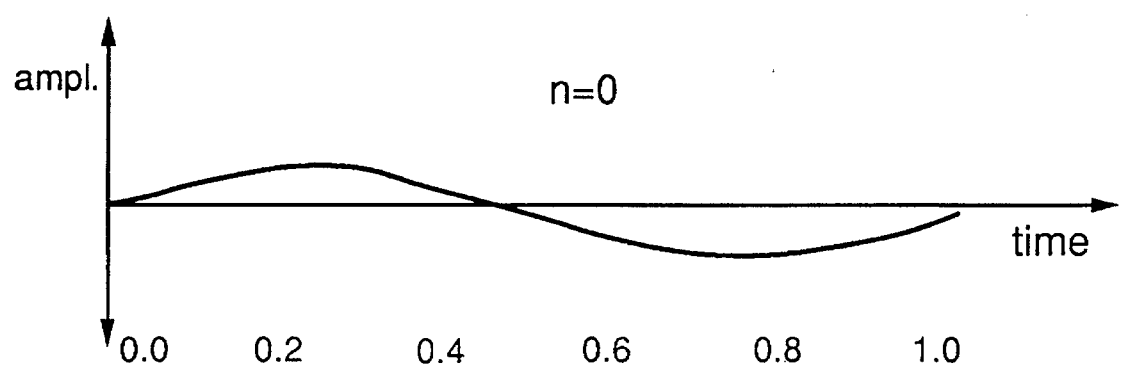
FIGS. 1a, 1b, 1c are graphs of the wave function $W_n(0, 1;t)$ for n=0,3,6, respectively, used in connection with explaining the present invention.
Figure 1B:
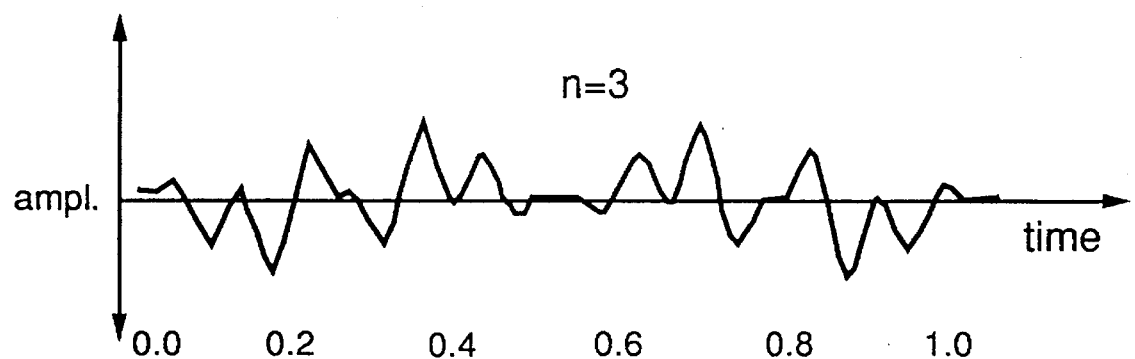
Figure 1C:
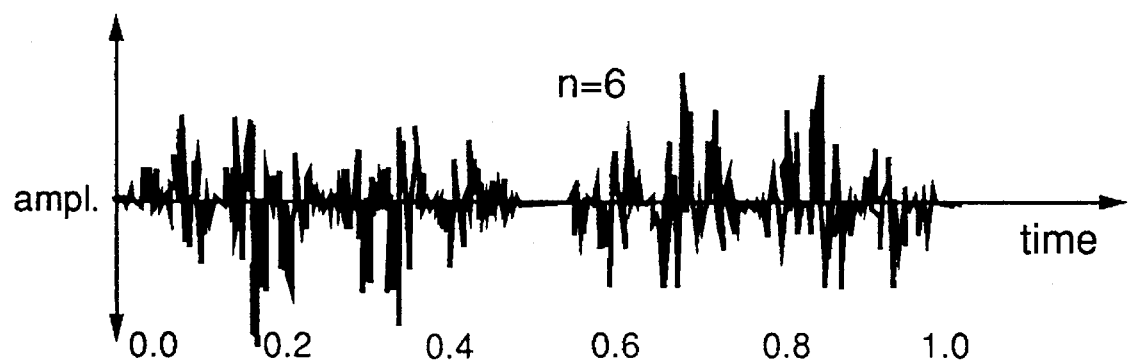

FIGS. 1a, 1b, 1c illustrate representative waveforms of $$2^{\frac{n+1}{2}} W(\Phi,1;t),$$

namely $W_0(0,1;t)$, $W_3(0,1;t)$ and $W_6(0,1;t)$, respectively, where 0 indicates that all of the phases $\phi_i$, are zero. (For these examples, R=1).

If $\{b^{(i)}(m)\}$ is the binary message sent by the i-th user, the i-th user signal can be expressed as $s^{(i)}(t)=b^{(i)}(m)W_n(\Phi, R;\xi)\delta([\xi^{(i)}])$ where $\xi^{(i)}=R(t-\tau^{(i)})-m$, $\tau^{(i)}$ is the time of the start of the i-th transmission, [.] is the greatest integer function, and where $\delta(.)$ is the Kronecker delta function.

The composite signal, S(t), is then:

$$S(t) = \sum_{i=1}^{N} b^{(i)}(m)W_n(\Phi,R;\xi\phi)\delta([\xi^{(i)}]). \quad (2)$$

where N is the number of users.

By writing $$\sin(2^i \cdot 2\pi Rt + \phi_i) = \quad (3)$$

$$\frac{1}{2j} [\exp(j\{2^i \cdot 2\pi Rt + \phi_i\}) - \exp(-j\{2^i \cdot 2\pi Rt + \phi_i\})]$$

it is easily seen that Equation (1) can be expanded into a sum as $$W_n(\Phi,R;t) = 2^{-n} \sum_{k=1,3,5\ldots}^{2^{n+1}-1} \Theta\left( \frac{k-1}{2} \right) \left\{ \begin{array}{l} (-1)^{n/2} \sin(k \cdot 2\pi Rt + A \cdot \Phi) \text{ for } n, \text{ even} \\ (-1)^{(n-1)/2} \cos(k \cdot 2\pi Rt + S \cdot \Phi) \text{ for } n, \text{ odd} \end{array} \right. \quad (4)$$

where $A=(\alpha_0, \alpha_1, \ldots \alpha_n)$ is a binary representation of the summation index k with:

$$\alpha_i = (\pm 1) \text{ and } k = \sum_{i=0}^{n} \alpha_i \cdot 2^i, \quad (5)$$

$$\Phi = (\phi_0, \phi_1, \ldots \phi_n), \quad (6)$$

$$A \cdot \Phi = \sum_{i=0}^{n} \alpha_i \phi_i, \quad (7)$$

$\Theta(k), k=0,1,2,\ldots$ is the Thue-Morse sequence. The Thue-Morse sequence can be thought of as the diagonal elements in the infinite Cartesian product $$\lim_{n \to \infty} H_n$$

where $H_n = H_{n-1} \otimes H_1$ and $$H_1 = \begin{pmatrix} 1 & 1 \\ 1 & -1 \end{pmatrix}.$$

(The first eight values, $\Theta(0)-\Theta(7)$, are (1 ,−1,−1,1,−1,1,1 ,−1).

Figure 2:
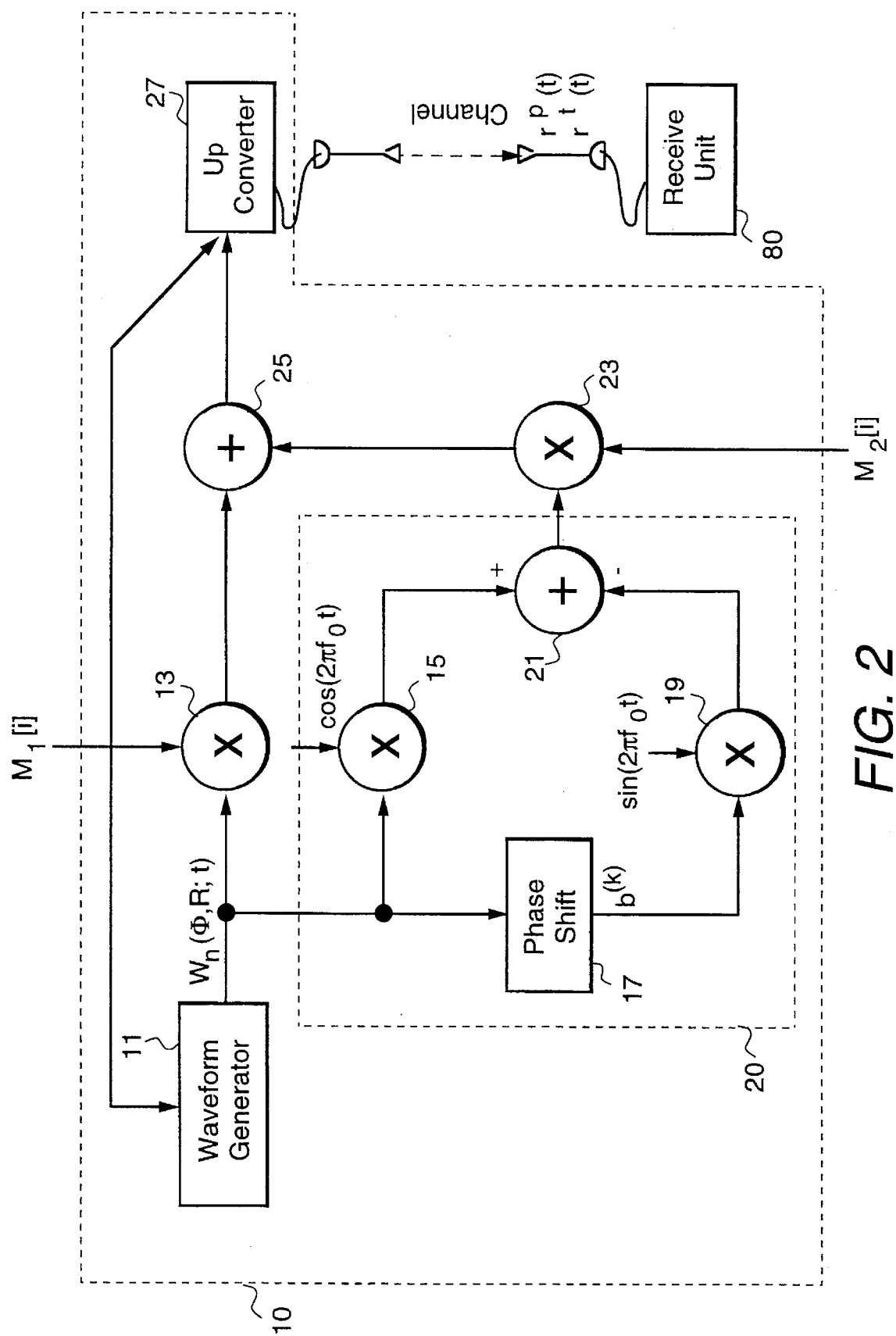
FIG. 2 is a simplified block diagram of a communications system according to the present invention.

With reference to FIG. 2, when a message is to be sent, the transmit unit 10 enters the synchronization or preamble mode. For an environment wherein there is negligible multipath, transmit unit 10 transmits a preamble signal for a series of cycles. A cycle is defined as the duration of time delimited by two successive negative to positive zero crossings of the lowest frequency of the preamble signal of a fundamental frequency $f_0$ the signal.

In waveform generator 11, a frequency of a master sinusoidal signal, or tone is selected. The master tone is divided down to produce frequencies of a plurality of tones, the lowest tone being a fundamental tone. Alternatively, a fundamental sinusoidal signal, or tone, having a fundamental frequency $2\pi f_0$ is selected. A plurality of tones having frequencies which are geometrically progressing multiples of a fundamental frequency, $2\pi f_0$, are derived to result in n+1 tones.

Phases $\Phi=\{\phi_i, i=1, 2, 3 \ldots n\}$ for each of the tones, except for the fundamental tone which has a phase of zero, are provided to waveform generator 11 by operator input, or are predetermined. The phases $\Phi$ in a preferred embodiment, are either of two substantially separated values, such as 0 and $-\pi/2$ radians, which may be selectable by an operator. Phases $\Phi$ are used as the spreading code for spreading an input signal across a frequency spectrum, and for despreading the signal at a receive unit. A preamble carrier waveform is constructed by in waveform generator 11 by summing the tones, each incorporating its phase.

$$W_n(\Phi,R;t) = \sum_{i=0}^{n} \sin(2^i \cdot 2\pi Rt + \phi_i) \qquad (8)$$

The preamble carrier waveform has the full transmit power distributed over the n+1 frequencies.

The phases $\Phi$ may also be used as an operator selectable 'address' of an attached message. In one possible embodiment, each receive unit knows its own 'address'. The receive unit constantly monitors preamble signals to identify the phase 'address'. If it encounters an 'address' which matches its own, it then despreads and decodes the appended message using its 'address'.

In an alternative embodiment, the phases $\Phi$ define a transmit unit ID. Each receive unit knows which transmit unit to 'pay attention to' at a given point in time. If the phase 'address' matches a transmitter which the receive unit is supposed to listen to, it despreads and decodes this appended message.

In still another embodiment, the phase 'address' is used to identify message types. Each receive unit knows which message type to monitor in a given situation. For example, a 'broadcast' message type 'address' will be received by all receive units, with a 'group 2' message type being despread and decoded by receive units which are presently designated as 'group 2' receive units, while other receive unit presently designated as 'group 1' or 'group 3' will ignore the message.

This preamble waveform is passed directly to an up converter 27 to transmit a signal to a receive unit 80.

After completion of the preamble mode, the present invention enters the signaling, or "traffic", mode. Waveform generator 11 creates a first traffic waveform $W_n(\Phi,R;t)$ as the product of the tones, each incorporating their respective phase, such as described in Eqs. (1) and (4) above. For n selected to be 5, $2^n=2^5=32$ components of the first traffic waveform are created, each having frequencies which are odd multiples of the fundamental frequency, odd harmonics, $6\pi f_0$, $10\pi f_0$, $14\pi f_0$, .... This first traffic waveform is encoded with a first message signal $m_1[i]$, by multiplier 13 which inverts or does not invert traffic carrier waveform $W_n(\Phi, R;t)$ for a whole bit period, being 1/R, to produce a first encoded waveform.

First traffic waveform $W_n(\Phi,R;t)$ is provided to a multiplier 15 which multiplies the first traffic waveform by cos $(2\pi f_0 t)$, being the cosine of the fundamental frequency to result in a first intermediate signal.

First traffic waveform $W_n(\Phi,R;t)$ is also provided to a phase shift unit 17 which provides $\pi/2$ phase shift to all components of first traffic waveform $W_n(\Phi,R;t)$ to result in a shifted waveform. Phase shift unit 17 may be any conventional device which causes a $-\pi/2$ phase shift to all components of first traffic waveform $W_n(\Phi,R;t)$. One such device is described in "A 200-MHz Double Sideband to Single Sideband Converter in 1-μm. CMOS Generated by Silicon Compiler" by R. Hawley, T. Lin and H. Samueli, 1992 *Symposium on VLSI Circuits Digest on Technical Papers*, IEEE (1992) pp. 72–73 which employs a 43-tap Hilbert Transform digital filter.

The shifted waveform is provided to a multiplier 19 which multiplies this signal by sin $(2\pi f_0 t)$, being the sine of the fundamental frequency, to result in a second intermediate waveform.

The first and second intermediate waveforms are differenced in summer 21 to provide a second traffic waveform.

Elements 15, 17, 19 and 21 collectively may be referred to as a frequency interlacer 20, since they phase offset and frequency shift the components of the first traffic waveform and convert them into a second traffic waveform to be employed in carrying a second message signal $m_2[i]$.

In order to illustrate the functioning of frequency interlacer 20, the input to the frequency interlacer is assumed to be a sinusoidal signal sin(x), and its signal is tracked through the device. After input signal passes through multiplier 15, it is:

$$\text{signal}=\sin(x)\cos(2\pi f_0 t). \qquad (9)$$

The output of phase shift unit 17 is sin $(x-\pi/2)$ or $-\cos(x)$. The output of multiplier 19 is:

$$\text{signal}=-\cos(x)\sin(2\pi f_0 t). \qquad (10)$$

The result from summer 21 is:

$$\text{signal}=\sin(x)\cos(2\pi f_0 t)-(-\cos(x)\sin(2\pi f_0 t)); \text{ or} \qquad (11)$$

$$\text{signal}=\sin(x+2\pi f_0 t). \qquad (12)$$

The output of the frequency interlacer is the input signal shifted in frequency by $2\pi f_0 t$, the fundamental frequency. If an input signal has a number of component frequencies $(1\pi f_0 t, 3\pi f_0 t, 5\pi f_0 t \ldots)$, they will be shifted to frequencies $(2\pi f_0 t, 4\pi f_0 t, 6\pi f_0 t \ldots)$.

The second traffic waveform is multiplied by second message signal $m_2[i]$, in the form of bit values of 1, $-1$, to result in a second encoded traffic waveform. This waveform is added to the first encoded traffic waveform at summer 25 to result in a traffic waveform which is provided to an up converter 27 that produces a signal which is transmitted to a plurality of receive units 80.

Figure 3:
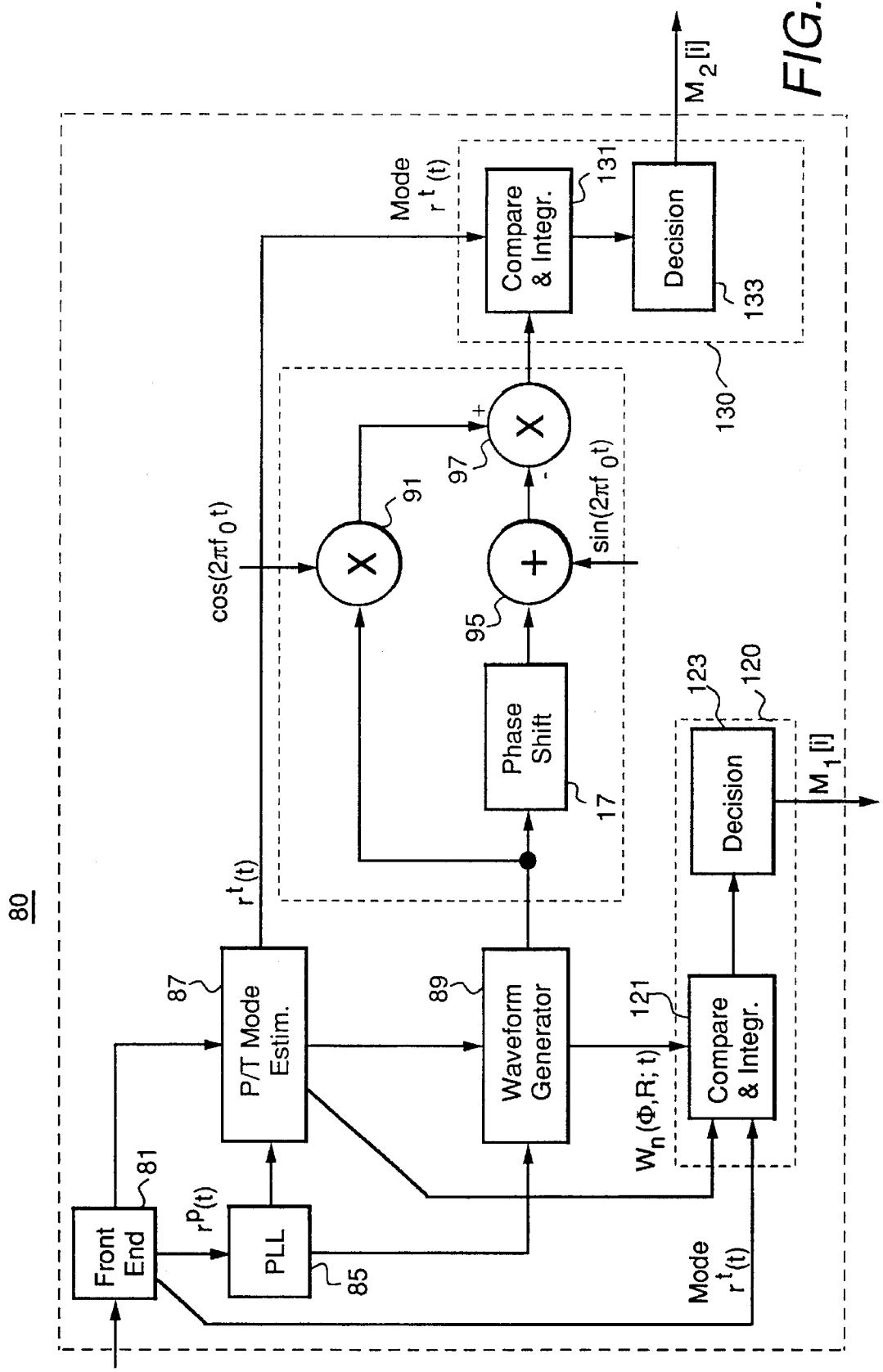
FIG. 3 is a more detailed block diagram of receive unit 80 of FIG. 2.

In FIG. 3, a more detailed block diagram of receive unit 80 of FIG. 2 is shown. A front end 81 down converts the signal received during the preamble mode $r^p(t)$, and a signal received during a traffic mode, $r'(t)$. A phase-locked loop (PLL) 85 tracks the fundamental frequency of the received signal and creates a time changing error signal which is used by a preamble/traffic mode estimator (P/T mode estim.) 87 to adjust the phase of a master oscillator of waveform generator 89 in order to minimize the difference in phase. The master oscillator is adjusted throughout the preamble mode. Thus, receive unit 80 establishes a phase reference by which it can estimate the phases of the n other sine waves.

P/T mode estim. 87 monitors even harmonics of the fundamental frequency $2\pi f_0$ for preamble signals and notifies elements of the receive unit 80, such as a compare and integrate units 121, 131 of dot product units 120, 130 that it is now in preamble mode. When the preamble mode is over, master oscillator runs without further correction, i.e., it "flywheels" through a traffic mode.

If the set of phases $\Phi$ is not already known or prestored in receive unit 80, P/T mode est. unit 87 also extracts the phases $\Phi$ during the preamble mode, to be used later as an address and despreading code.

If the phases $\Phi$ correspond to an 'address' which receive unit 80 is searching for, a message immediately following the preamble signal is despread and decoded using the phases Φ acquired during the preamble mode.

Once P/T mode estim. unit 87 senses that the traffic mode has begun, waveform generator 89 employs the fundamental frequency from PLL unit 85, and the phases Φ to produce a first traffic reference waveform, being the same as the first traffic waveform as described for waveform generator 11 in transmit unit 10.

The first reference waveform is sent from waveform generator 89 to a compare and integrate unit 121 of dot product unit 120. The received traffic signal is provided from P/T mode estimator 87 to compare and integrate unit 121, which is compared to the first reference waveform. The result of the comparison is integrated over all frequencies of the received traffic signal, for an entire bit period.

A decision device 123 compares the result of the comparison and integration to a predetermined threshold to determine if the bit value; above the threshold is a first bit value, and not above indicates a second bit value.

This is repeated for all bit periods of the message to result in the first message signal $m_1[i]$.

Waveform generator 89 provides the first traffic waveform $W_n(\Phi,R;t)$ to a frequency interlacer 90 of receive unit 80. Frequency interlacer 90, and elements 91, 93, 95, 97 of receive unit 80, operate the same as frequency interlacer 20 and elements 15, 17, 19, 21 of transmit unit 10, respectively. The output of frequency interlacer 90 is second reference waveform that is provided to a compare and integrate unit 131 of dot product unit 130.

The received traffic signal is provided from P/T mode estimator 87 to compare and integrate unit 131, which is compared to the second reference waveform. The result of the comparison is integrated over all frequencies of the received traffic signal, for an entire bit period.

A decision device 133 compares the result of the comparison and integration to a predetermined threshold to determine if the bit value; above the threshold is a first bit value, and not above indicates a second bit value.

This is repeated for all bit periods of the message to result in the second message signal $m_2[i]$.

It is important to note that each of the message signals may be independent, or that each may have a portion of a single message. Also, it is an advantage of the present invention that the message signals $m_1[i]$, $m_2[i]$ be sent and decoded simultaneously with little or no mutual interference, increasing data capacity and spectral efficiency.

Figure 4:
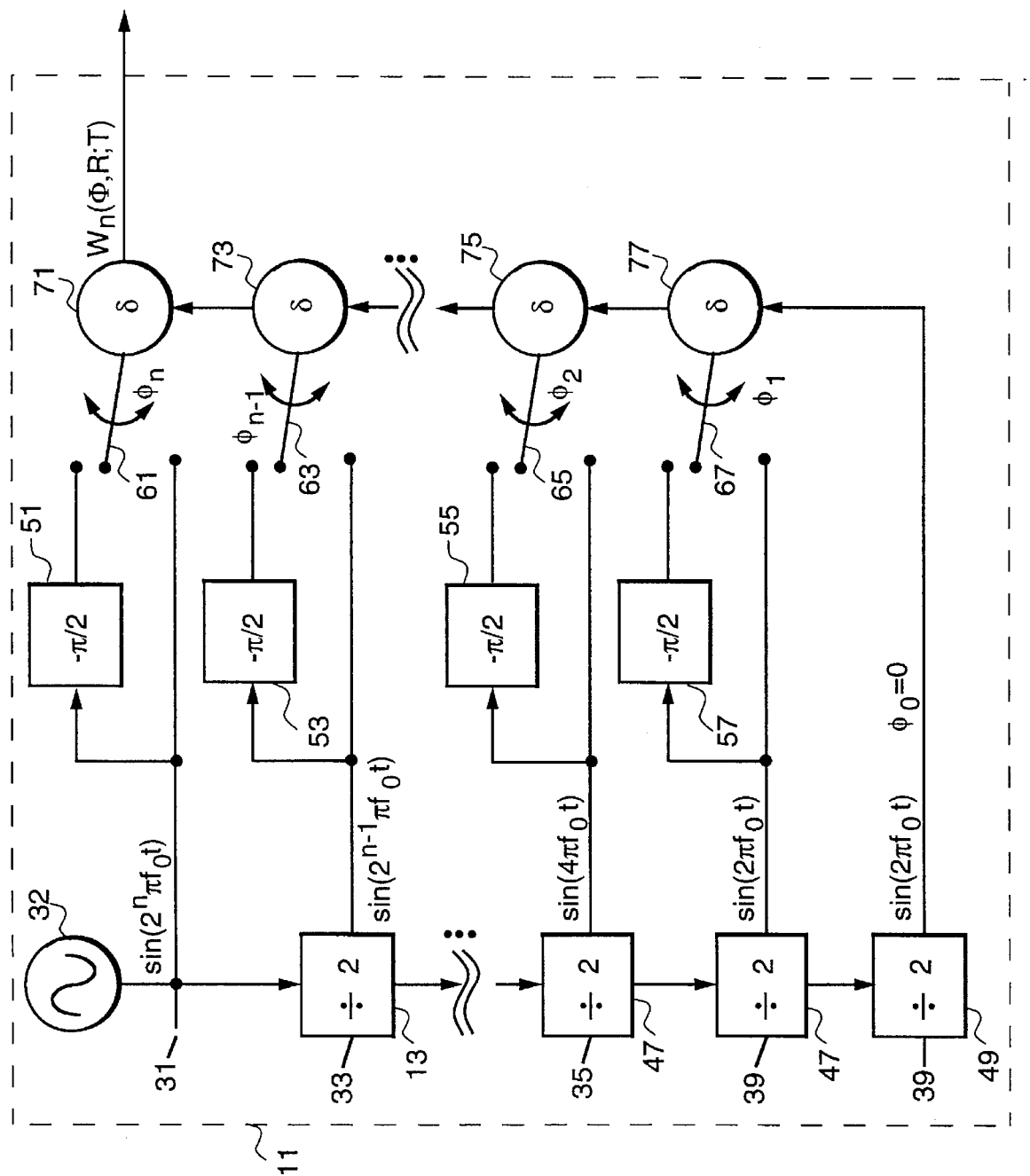
FIG. 4 is a more detailed block diagram of the waveform generators of FIGS. 2, 3.

In FIG. 4, a more detailed diagram of waveform generators 11, 89 of FIGS. 1, 3 compatible with the present invention, is shown.

A reference oscillator 32 produces a signal, such as a sine wave of a frequency $2^{n*}2\pi f_0$. This reference sine wave is provided to a plurality of branches 31, 33, 35, 37, 39. Only five branches are shown here, but it is to be understood that will be n+1 branches, with the branch of the lowest frequency component $2\pi f_0$ having a phase $\phi_0$ of 0. Frequency dividers 43, 45, 47, 49 divide the frequency of the sine wave of previous branches in half to result in n+1 sinusoidal signals or 'tones'. Phase devices 51, 53, 55, 57 provide a predetermined phase, here being $-\pi/2$, to selected tones. Branch 39 with the fundamental tone having a frequency $2\pi f_0$, will in the preferred embodiment, always be set to a phase of zero, thereby resulting in only n phases instead of n+1.

Switches 61, 63, 65, 67 are switched to either incorporate the phase of devices 51–57, or not to incorporate these offsets. Switches 61–67 are set to correspond to a predetermined address, or despreading 'key'.

Delta gates 71, 73, 75, 77 act as summers when transmit unit 10 is operating in a preamble mode, and act as multipliers in the traffic mode. The delta gates may be collectively referred to as a combining device. If n is selected to be 5, then 6 tones, each with their own phase $\phi_i$ are transmitted by transmit unit 10 during the preamble mode. The result is a waveform according to Eq. (8) during the preamble mode and a waveform according to Eq. (1) during the traffic mode.

Since all tones employed by the present invention are multiples of a fundamental tone, and the fundamental tone has a phase of zero, synchronization is much simpler than conventional direct spread spectrum systems.

The present invention makes efficient use of bandwidth. Both a first and second message may be transmitted on the same carrier waveform. This results in an increased capacity, spread spectrum modulation technique.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of direct spread spectrum communication of two simultaneous message signals $m_1[i]$, $m_2[i]$ from a transmit unit to a receive unit comprising the steps of:

a) producing a first traffic waveform described by:

$$W_n(\Phi,R;t) = \overset{n}{\underset{i=0}{\pi}} \sin(2^i \cdot 2\pi Rt + \phi_i);$$

where n is an "order" of the function, $\Phi=(\phi_0, \phi_1, \ldots \phi_n)$ is a tone phase set used as a spreading and despreading code, t is time, and R is a rate at which said binary message is to be transmitted;

b) encoding said first message signal $m_1[i]$ in first traffic waveform to result in a first encoded waveform;

c) shifting the frequency of each component of the first waveform to result in of a second traffic waveform having components with frequencies which are between those of the first traffic waveform;

d) encoding said second message signal $m_2[i]$ in second traffic waveform to result in a second encoded waveform;

e) summing the first and second encoded waveforms to result in a traffic signal;

f) transmitting the traffic signal to said receive unit;

g) receiving the traffic signal at said receive unit;

h) decoding the traffic signal into said first and second message signal $m_1[i]$, $m_2[i]$.

2. The method of direct spread spectrum communication of claim 1 wherein the components of first traffic waveform are each shifted by the fundamental frequency of $2\pi f_0 t$.

3. The method of direct spread spectrum communication of claim 1 further comprising, before the step of producing a first traffic waveform, the steps of:

a) selecting a tone phase set $\Phi=(\phi_0, \phi_1, \phi_n)$, as an address of the message used as a spreading and despreading code;

b) creating a preamble signal being a sum of tones incorporating their tone phases described by:

$$W_n(\Phi, R; t) = \sum_{i=0}^{n} \sin(2^i \cdot 2\pi R t + \phi_i);$$

c) transmitting the preamble signal to the receive unit;
d) receiving the preamble signal at the receive unit; and
e) extracting the tone phases $\Phi = (\phi_0, \phi_1, \ldots \phi_n)$ at said receive unit to be used as a despreading code.

\* \* \* \* \*